Patented Nov. 17, 1936

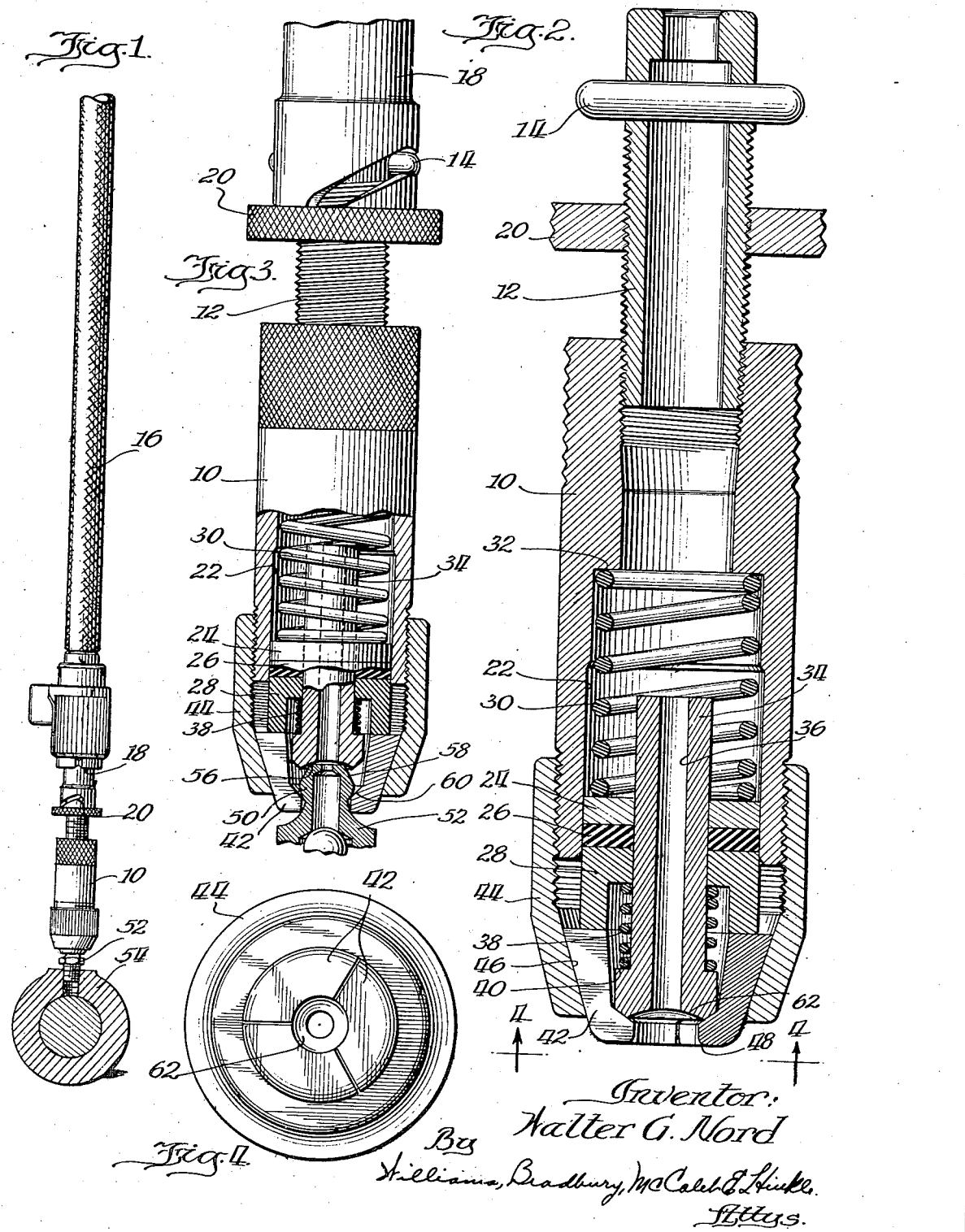

2,061,086

UNITED STATES PATENT OFFICE 2,061,086

LUBRICATING APPARATUS

Walter G. Nord, Amherst, Ohio, assignor to Stewart-Warner Corporation, Chicago, Ill., a corporation of Virginia Application April 5, 1934, Serial No. 719,086

3 Claims. (Cl. 285—169)

My invention relates generally to lubricating apparatus, and more particularly to improvements in couplers for high pressure lubricating systems.

It is an object of my invention to provide an improved form of coupler for making a lubricant tight connection with a lubricant receiving fitting of the headed type.

A further object is to provide an improved coupler for high pressure lubricating apparatus in which the coupler is automatically operated by lubricant pressure.

A further object is to provide an improved form of coupler for high pressure lubricating apparatus which is simple in construction, which may be economically manufactured, which is durable, and which will form a connection capable of sustaining high lubricant pressures.

Other objects will appear from the following description, reference being had to the accompanying drawing, in which:

Fig. 1 is an elevation of the coupler shown attached to the discharge conduit of a lubricant compressor;

Fig. 2 is an enlarged central longitudinal section of the coupler;

Fig. 3 is a view similar to Fig. 2 showing the coupler attached to a lubricant receiving fitting; and Fig. 4 is an end view taken on the line 4—4 of Fig. 2.

The coupler comprises a tubular body 10 threaded at one end to receive the body 12 of a fitting having a cross pin 14 extending diametrically therethrough. The fitting is adapted to be coupled to the discharge conduit 16 of a high pressure lubricant compressor by means of a coupler 18 secured to the end of the conduit. The coupler 18 may be of the general type disclosed in the patent to Arthur V. Gullborg, No. 1,307,734, dated June 24, 1919.

A lock nut 20 is threaded on the body 12 and adapted to be screwed against the end face of the coupler 18 as shown in Fig. 1, thereby to lock the fitting part 12 in the coupler. The coupler of my invention thus forms an adapter to condition the fitting 12 for the lubrication of bearings equipped with headed lubricant receiving fittings.

The body 10 of the coupler is axially counterbored to form a cylinder 22 in which a piston comprising a face plate 24, a compressible gasket 26 and a cup-shaped member 28, is reciprocable. The piston is pressed outwardly by a compression coil spring 30, one end of which is seated against the face plate 24 and the other end of which abuts against a shoulder 32 formed within the body 10. A nozzle element 34 is reciprocably mounted in the piston. The nozzle element has a central passageway 36 extending therethrough and is normally pressed outwardly by a coil spring 38 which is pressed between the cup member 28 and a shoulder 40 formed on the nozzle element.

A plurality of jaws 42, illustrated as three in number, are mounted for longitudinal and radial movement within a casing 44 which is threaded to the end of the body 10. The casing 44 has a frusto-conical camming surface 46 formed therein as a camming seat for the jaws 44, the latter having outer surfaces substantially complemental to the frusto-conical surface 46. The jaws 42 have inwardly projecting portions 48 which, as illustrated in Fig. 3, are adapted to be engaged beneath the head 50 of a lubricant receiving fitting 52. The fitting is illustrated in Fig. 1 as threaded into the oil hole of a bearing 54 which is to be lubricated. As best shown in Fig. 2, the fitting 52 has a flat top bounded by a circular dirt-cutting edge 56, a frusto-conically surfaced portion 58, and a spherically surfaced portion 60.

It will be noted that the end of the nozzle part 34 has a spherically concave contact surface 62 which is of sufficient diameter to embrace the dirt-cutting edge 56 of the fitting, and upon being pressed thereagainst make a lubricant tight seal with the end of the fitting, the contact being substantially a line contact. Due to the shape of the contact surface 62 it is not necessary that the coupler be in exact axial alignment with the fitting. The coupler may be tilted through a small angle in any desired direction relative to the axis of the fitting without interfering with the lubricant-tight connection which is established by its contact with the fitting.

When it is desired to use the coupler of my invention for the lubrication of bearings equipped with fittings of the type illustrated in the drawing by means of a compressor equipped with a bayonet joint type coupler 18, the fitting 12 is connected to the coupler 18 and secured against removal therefrom by turning up the lock nut 20 against the end face of the coupler. The coupler will then be in condition for the lubrication of bearings and may be readily connected to a fitting 52 merely by pushing it longitudinally against the fitting. The ends of the jaws will engage the fitting and be pushed inwardly relative to the casing 44. Incident to this inward movement the jaws may be moved radially outward, thus increasing the aperture formed between their inwardly projecting jaw portions 48, sufficiently to permit the head of the fitting to pass therethrough. As soon as the inwardly projecting portions 48 of the jaws pass the portion of the head of the fitting of greatest diameter, the spring 30 which will have been compressed by the inward movement of the jaws, will expand, forcing the jaws longitudinally outwardly and radially inwardly about the neck of the fitting. At the same time the spring 38 will force the nozzle element 34 against the end of the fitting, causing the contact surface 62 of the nozzle to engage the dirt cutting edge 56 of the fitting.

After the coupler has thus been attached to a fitting, lubricant under pressure is permitted to flow and will act upon the piston 24, 26, 28 to force the cup member 28 against the jaws of the fitting, thus augmenting the force applied by the spring 30. Similarly the lubricant pressure acting upon the nozzle element 34 will augment the pressure of the spring 38 in forcing the nozzle element firmly against the end of the fitting. To assure a lubricant tight contact of the nozzle with the fitting it is desirable that the external diameter of the nozzle element 34 be greater than the diameter of the dirt-cutting edge 56 of the fitting. If the diameter of the nozzle element were less than the diameter of the dirt-cutting edge, the back pressure exerted upon the nozzle element might be sufficient to remove the nozzle element from contact with the fitting and permit leakage of lubricant.

After sufficient lubricant has been supplied to a bearing the coupler may be disconnected from the fitting merely by pressing the body of the coupler toward the fitting, thereby loosening the hold of the jaws upon the fitting and permitting the coupler, especially if it is tilted slightly relative to the fitting, to be readily disconnected from the latter. All of the parts of the coupler with the exception of the washer 26 are made of metal and are very durable. The washer 26 may readily be replaced should it deteriorate or become excessively worn. The washer is preferably made of a sufficiently compressible material that the lubricant pressure acting upon the face plate 24 of the fitting will cause the washer 26 to be forced in sufficiently tight contact with the walls of the cylinder and with the outer surface of the nozzle element 34, that there will be no leakage of lubricant past the piston or between the piston and the nozzle element.

While I have shown and described a preferred embodiment of my invention, it will be readily understood by those skilled in the art that variations may be made in the construction disclosed without departing from the basic features of my invention. I therefore do not wish to be limited to the precise details of construction disclosed but wish to include within the scope of my invention all such modifications and variations which will readily suggest themselves.

What I claim as new and desire to secure by United States Letters Patent is:

1. A coupler for high pressure lubricating apparatus comprising a casing, a plurality of jaws movably mounted for both longitudinal and radial movements in said casing and arranged upon application of lubricant pressure to the coupler to be forced into clamping engagement with a lubricant receiving fitting, a piston for transmitting the pressure of lubricant within the coupler to said jaws, a compression spring forcing said piston against said jaws, and a spring and lubricant pressed nozzle element reciprocable within said piston and having a concave spherical contact surface for making a universal lubricant tight joint with a fitting to which lubricant is to be supplied.

2. A coupler for high pressure lubricating apparatus comprising a body having a cylindrical bore therein, means to supply lubricant under pressure to said bore, a piston reciprocable in said bore, a casing threaded to said body and having an inwardly tapering inner surface, a plurality of jaws reciprocable in said casing and bearing against said surface, means associated with said piston for forcing said jaws longitudinally outwardly and radially inwardly, and a nozzle element reciprocable in said piston and having a metallic spherically concave contact surface for making sealing contact with a lubricant receiving fitting.

3. In a coupler for high pressure lubricating apparatus, the combination of a body having an axial bore therein, a piston reciprocable in said bore, a spring engageable with said piston to force the latter outwardly, a casing threaded to said body and having an inwardly tapering surface, a plurality of jaws engageable with said surface and actuated by said piston, a nozzle reciprocable in said piston and having a spherically concave contact surface for making a lubricant-tight sealed connection with a lubricant receiving fitting, and a spring positioned between said piston and said nozzle and operable to force said nozzle into engagement with the fitting.

WALTER G. NORD.